United States Patent [19]

Okano

[11] Patent Number: 5,122,954
[45] Date of Patent: Jun. 16, 1992

[54] CONTROL SYSTEM FOR ACTUATING VEHICLE AIR-BAGS

[75] Inventor: Masami Okano, Higashimatsuyama, Japan

[73] Assignee: Diesel Kiki Co., Ltd., Tokyo, Japan

[21] Appl. No.: 503,976

[22] Filed: Apr. 4, 1990

[30] Foreign Application Priority Data

Apr. 12, 1989 [JP] Japan ................ 1-42457[U]

[51] Int. Cl.⁵ ............................................. B60R 21/08
[52] U.S. Cl. ............................. 364/424.05; 180/271; 180/282; 280/735; 340/436
[58] Field of Search ............. 364/424.05; 180/271, 180/274, 282; 280/728, 734, 735, 736; 340/436, 438; 307/10.1

[56] References Cited

U.S. PATENT DOCUMENTS

| | | | |
|---|---|---|---|
| 3,911,391 | 10/1975 | Held et al. | 280/735 |
| 4,020,453 | 4/1977 | Spies et al. | 280/735 |
| 4,380,346 | 4/1983 | Davis et al. | 280/736 |
| 4,979,763 | 12/1990 | Blackburn | 280/735 |

Primary Examiner—Gary Chin
Attorney, Agent, or Firm—Pollock, Vande Sande & Priddy

[57] ABSTRACT

In a control system for actuating a vehicle air-bag, a data representing change in the detected vehicle speed is calculated on the basis of the acceleration sensed by a vehicle acceleration sensor. The data is compared with a reference signal depending upon a temperature relating to that of an actuating member of the air-bag to discriminate whether or not the change in the detected vehicle speed has reached a level determined by the reference signal, whereby the complete inflation of the air-bag is ensured when a collision occurs without a time delay regardless of changes in temperature.

12 Claims, 3 Drawing Sheets

CONTROL SYSTEM FOR ACTUATING VEHICLE AIR-BAGS

BACKGROUND OF THE INVENTION

1. Field of the Invention

The present invention relates to a control system for actuating vehicle air-bags, and more particularly to a system for controlling the firing time of an inflater of an air-bag.

2. Description of the Prior Art

For ensuring the safety of car occupants from the shock occurring at the time of a vehicle collision, there has been used an air-bag control system, in which firing current is supplied to an electrically fired actuator to cause gas to be produced by a chemical reaction by igniting gunpowder so that the air-bag is inflated by the gas. Accordingly, for the control system of this type it is necessary to detect when a collision has occurred as soon as possible, and to ignite the gunpowder without fail when a collision has occurred.

To meet these requirements, in the conventional air-bag control system, the output signal from an acceleration sensor is integrated when the output level of the acceleration sensor mounted on the vehicle exceeds a predetermined level to obtain information concerning the vehicle speed thereafter, and it is determined that the vehicle has collided with an obstruction when the decrease in the vehicle speed reaches a prescribed level and the gunpowder is then ignited. Such a conventional system is disclosed in, for example, U.S. Pat. No. 3,911.391.

It is generally said that a safety device can effectively protect the car occupants only if it can limit the maximum displacement of the occupants, especially their heads, to within fifteen to twenty centimeters at the time of collision. Accordingly, considering that it takes approximately thirty milliseconds from the time of the actuation of an electrically fired air-bag actuator to the time of the completion of the expansion thereof, it is necessary to decide whether or not a collision has occurred within twenty to twenty-five milliseconds after it happens. The conventional control apparatus of this kind is of course designed in consideration of this fact to perform the appropriate triggering operation for the electrically or mechanically fired actuator.

On the other hand, the rate of pressure increase in the air-bag occurring after the triggering of the inflater depends largely upon the ambient temperature at that time. For example, at an ambient temperature of $-40(°C.)$, it will be the 10(m sec) or more longer to obtain the required inflation of the air-bag than at room temperature. Consequently, it is not always possible to ensure the appropriate triggering control of the air-bag in the case where the triggering timing of the air-bag is determined in the way described above on the basis of only the magnitude of the acceleration occurring at the time of vehicle collision, so that it may be difficult to ensure the safety of the car occupants in the case where a collision occurs at a low temperature.

SUMMARY OF THE INVENTION

It is an object of the present invention to provide an improved control system for actuating vehicle air-bags.

It is another object of the present invention to provide a control system for actuating vehicle air-bags with high reliability.

It is another object of the present invention to provide a control system for actuating vehicle air-bags which is capable of reliably triggering an electrically fired actuator for the air-bag.

According to the present invention, in a control system for actuating vehicle air-bags, the system comprises an acceleration sensor for producing an output signal representing the acceleration of the vehicle, a processing means for producing data representing change in the detected vehicle speed calculated based on the acceleration sensed by the acceleration sensor, a detecting means for detecting a temperature, related to that of the air-bag, and a discriminating means responsive to the processing and detecting means for discriminating whether or not a collision has occurred in the vehicle by comparing the data with a reference signal which is determined in accordance with the detected temperature.

The acceleration occurring in the vehicle at the time of a collision is detected by the acceleration sensor and the data representing the change in the detected vehicle speed is obtained based on the acceleration detected by the acceleration sensor. On the other hand, the temperature relating to that of the air-bag is detected by the detecting means, and the discriminating means discriminates whether or not the detected vehicle speed obtained by the processing means exceeds a reference level determined in accordance with the detected temperature, whereby it is determined whether or not collision has occurred. Thus, appropriate discrimination of the occurrence of the collision can be carried out with reference to a reference level determined in accordance with the detected temperature relating to that of the air-bag at each instant.

The invention will be better understood and other objects and advantages thereof will be more apparent from the following detailed description of preferred embodiments with reference to the accompanying drawings.

DESCRIPTION OF THE PREFERRED EMBODIMENT

Figure 1:
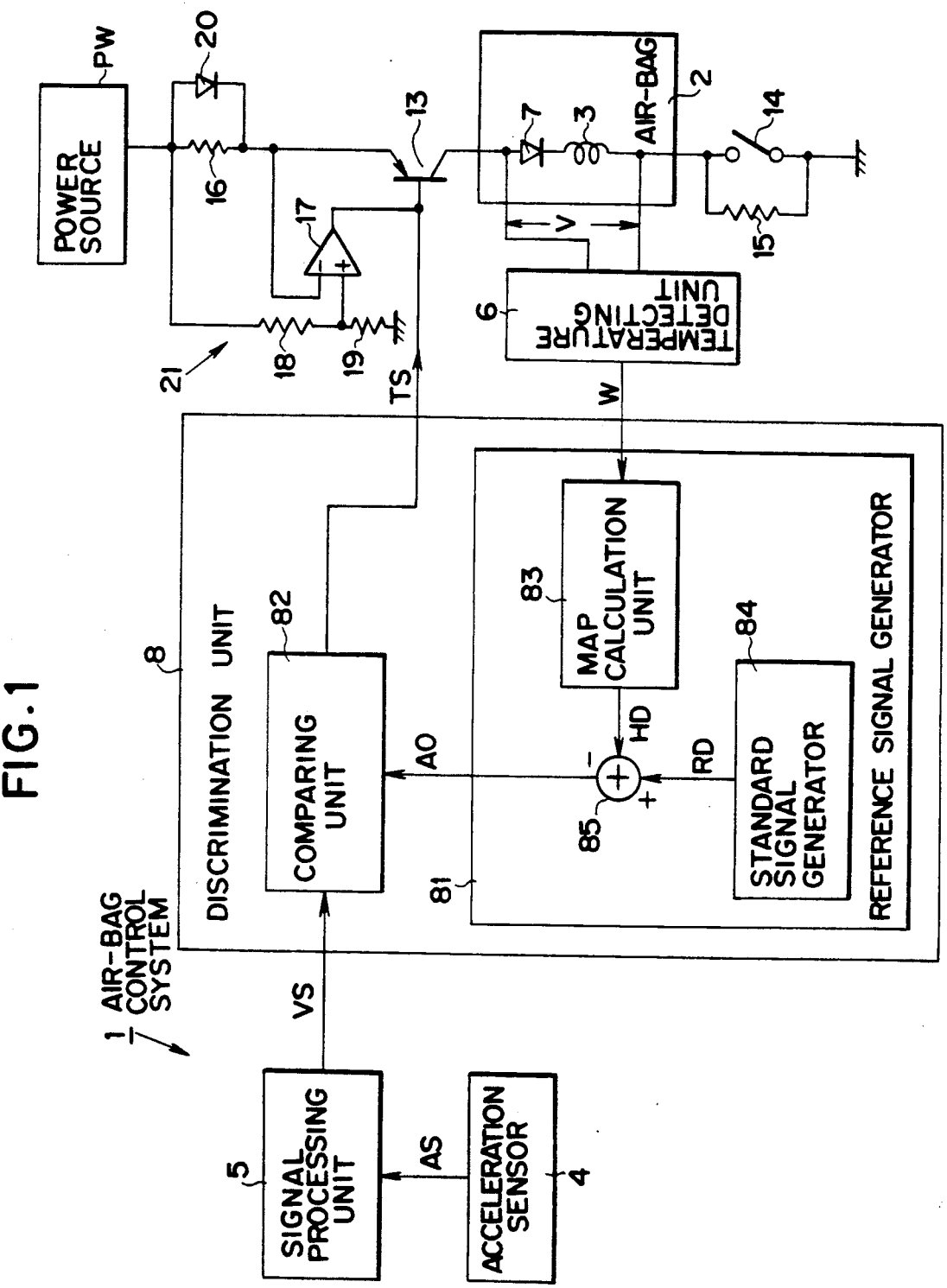
FIG. 1 is a block diagram showing an embodiment of a control system for actuating air-bags according to the present invention.

In FIG. 1, there is shown an air-bag control system for controlling the actuation of an air-bag for vehicles in accordance with the present invention. An air-bag control system 1 is for controlling the actuating current for an electrically fired actuator 3 provided in an air-bag 2 mounted on the vehicle (not shown), and has an acceleration sensor 4 for sensing the acceleration of the vehicle, which may be the conventional semiconductor type vehicle acceleration sensor of well-known design for detecting the magnitude of the positive/negative change in the speed of the vehicle per unit time as an acceleration. The acceleration sensor 4 is mounted at, for example, the appropriate place in the engine compartment and the output signal AS showing the acceleration acting on an vehicle body is produced thereby.

The output signal AS is supplied to a signal processing unit 5 where it is amplified. In the signal processing unit 5 discrimination is made as to whether or not the acceleration shown by the output signal AS is in a predetermined range falling outside the range of acceleration occurring in normal operation of the vehicle and within the range of acceleration occurring during collision. After the acceleration shown by the output signal AS has once entered the predetermined range, the output signal AS produced thereafter is integrated and the signal processing unit 5 produces a detected speed signal VS indicating the change in the vehicle speed after the acceleration at a level never incurred in normal operation is detected.

Figure 2:
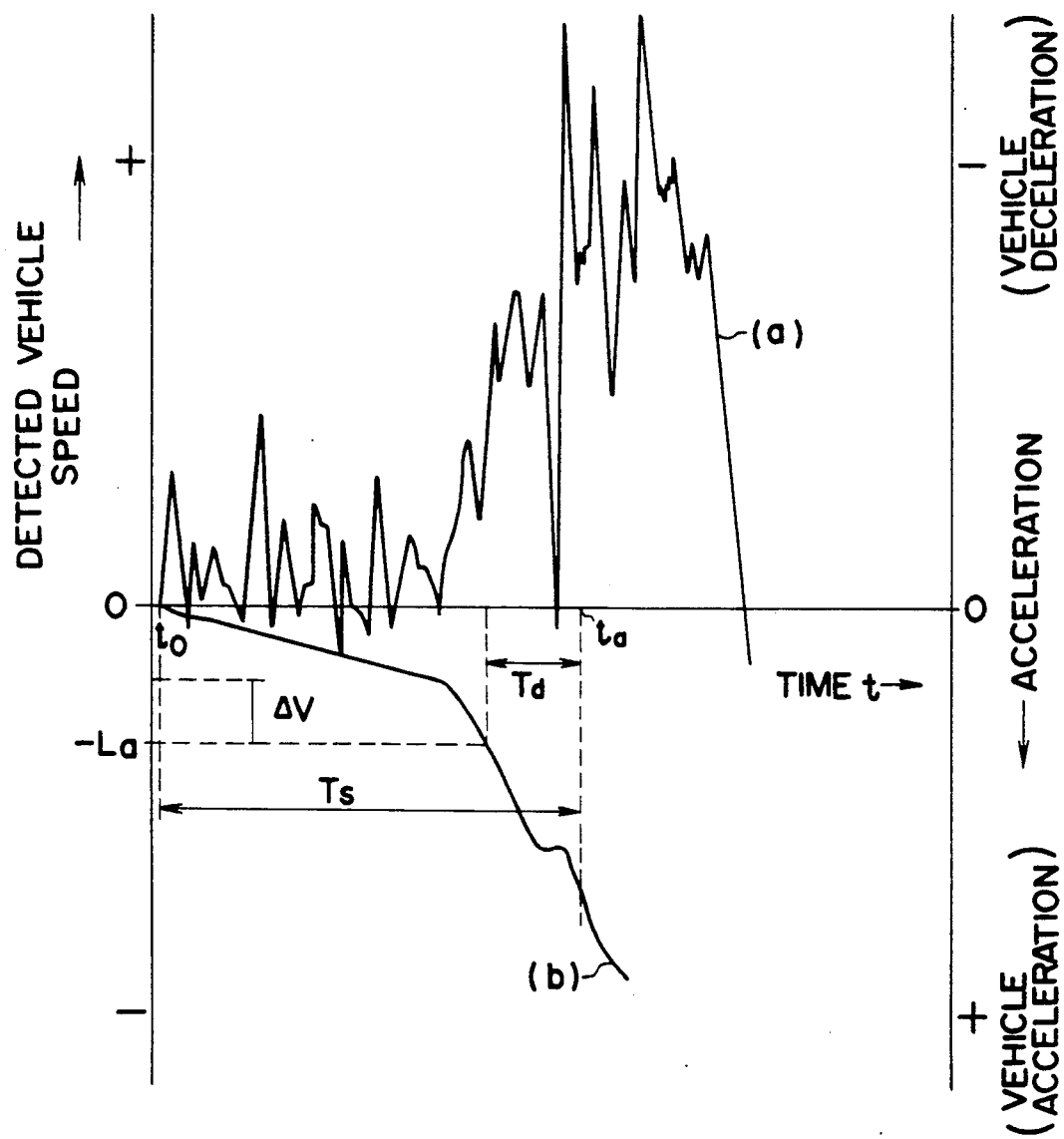
FIG. 2 is a graph showing an example of the changes in the acceleration of a vehicle and the corresponding detected vehicle speed in a collision, for explaining the operation of the control system shown in FIG. 1.

FIG. 2 is a graph showing an example of the change in the acceleration of a vehicle detected by the acceleration sensor 4 in the case where the vehicle collides with a forward obstruction. In this graph, time t is plotted along the abscissas and the curve (a) shows the change in the acceleration of the vehicle. Furthermore, the curve (a) starts at $t = t_0$ where the the vehicle acceleration shown by the output signal AS has entered the predetermined range, and the integration operation for the output signal AS starts in the signal processing unit 5 after $t_0$. In FIG. 2, the detected vehicle speed shown by the detected speed signal VS, which is obtained by integrating the output signal AS as described above, is shown by the curve (b).

Returning to FIG. 1, the air-bag control system 1 further comprises a temperature detecting unit 6 for detecting a temperature relating to that of the air-bag 2. In this embodiment, the temperature of the electrically fired actuator 3 is detected on the basis of the diffusion voltage of a diode 7, which is placed adjacent to the electrically fired actuator 3 and is connected in series with the electrically fired actuator 3. The diffusion voltage is the voltage developed across the diode 7 when forward current flows in the diode 7, and the magnitude thereof varies in accordance with the temperature of the diode 7. The detection voltage V developed across the series circuit of the electrically fired actuator 3 and the diode 7 when the detection current flows through the series circuit of the diode 7 and the electrically fired actuator 3, is applied to the temperature detecting unit 6, and the ambient temperature of the electrically fired actuator 3 is determined on the basis of the level of the detection voltage V in the temperature detecting unit 6. The detected ambient temperature is substantially equal to that of the electrically fired actuator 3. A temperature signal W indicating the temperature determined by the temperature detecting unit 6 is produced from the temperature detecting unit 6 and is supplied to a discrimination unit 8 to which the detected speed signal VS is also supplied.

The discrimination unit 8 is composed of a reference signal generator 81 and a comparing unit 82, and serves to discriminate whether or not collision has occurred in the vehicle in response to the detected speed signal VS and the temperature signal W.

Figure 3:
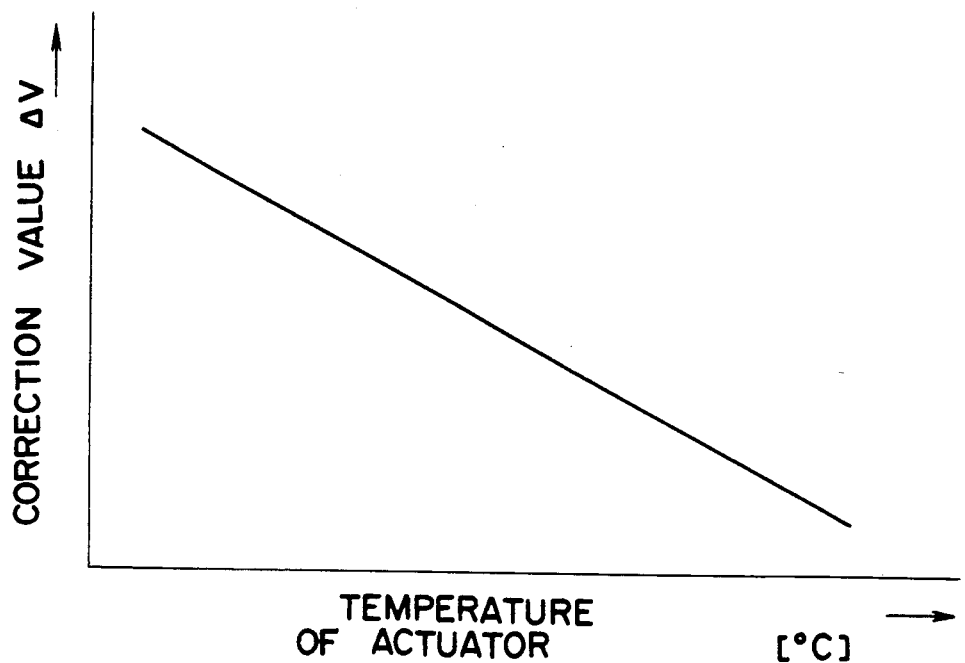
FIG. 3 is a graph showing a relationship between the temperature of the electrically fired actuator and the correction value used in the discrimination unit.

The reference signal generator 81 comprises a map calculation unit 83 in which the map calculation is carried out in response to the temperature signal W in accordance with map data corresponding to characteristics showing the relationship between the temperature of the electrically fired actuator 3 and a correction value, which is shown in FIG. 3. That is, a correction value corresponding to the temperature indicated by the temperature signal W is determined by the map calculation in the map calculation unit 83. In this embodiment, as shown in FIG. 3, the correction value decreases as the temperature increases, and a correction signal HD representing the calculated correction value is output from the map calculation unit 83. The reference signal generator 81 further comprises a standard signal generator 84 which produces a standard signal RD representing a standard level, and the correction signal HD is added to the standard signal RD by an adding unit 85 in the polarity shown in FIG. 1 to produce a reference signal AO. The reference signal AO is applied to the comparing unit 82 to which the detected speed signal VS is also applied, and the detected speed signal VS is compared with the reference signal AO for discriminating whether or not a collision has occurred.

As described in the foregoing, the reference signal AO is indicative of the reference level which is used for determining whether or not a collision has occurred on the basis of the detected speed signal VS, and this reference level is usually determined as follows.

In order to complete the necessary operation of the air-bag 2 before the displacement of the head of the occupant due to a collision has reached a predetermined allowable maximum distance, that is, 10 to 15 centimeters, required for ensuring their protection, assuming that the delay time from the time of the production of an air-bag triggering signal to the complete expansion of the air-bag 2 is $t_d$ and the head of the occupant(s) is displaced by the predetermined allowable maximum distance at $t_a$, that is, after the passage of time $t_s$ from the occurrence of the collision, the level of the detected vehicle speed at the passage of time $t_a - t_d$ from the time of the collision is determined at $t_o$ as the standard level $-L_a$ (see FIG. 2).

The level of the standard signal RD set as described above is corrected by the correction value $\Delta V$, which is determined in accordance with the detected ambient temperature, in the adding unit 85, and the reference signal AO is produced from the adding unit 85.

As will be understood from the graph shown in FIG. 3, the correction valve varies in accordance with the temperature in such a way that the reference level represented by the reference signal AO becomes greater as the temperature decreases, so that earlier determination of collision is made as the temperature becomes lower. Thus, when the time necessary for completely inflating the air-bag 2 is increased because of a decrease in temperature, the time delay for attaining complete expansion of the air-bag 2 is compensated for by an earlier triggering operation. Thus, the protection of the car occupants can be ensured even when the temperature is low. When the level of the detected speed signal VS becomes smaller than the reference level indicated by the reference signal AO, the air-bag triggering signal TS is generated from the comparing unit 82 and applied to a driving transistor 13.

The collector of the driving transistor 13 is grounded through the diode 7, the electrically fired actuator 3, and a parallel circuit constituted of a safety switch 14 and a resistor 15, and the emitter thereof is connected through a parallel circuit constituted of a resistor 16 and a diode 20 with a power source PW, from which the firing current for actuating or triggering the electrically fired actuator 3 is supplied.

The resistor 16 serves to form a constant current circuit 21 together with an operational amplifier 17 and resistors 18 and 19, and the constant current circuit 21 serves to provide the base bias current necessary for causing a detection current to flow in the collector circuit of the driving transistor 13. In the circuit arrangement described above, the safety switch 14 is responsive to the vehicle running speed and is turned on only when the vehicle running speed is greater than a prescribed speed, whereby the air-bag 2 is effectively prevented from being actuated erroneously when, for example, the vehicle is not running. The resistor 15 permits the detection current to flow through the electrically fired actuator 3 even if the safety switch 14 is in its off state. The value of the resistor 16 should be determined in such a way that the diode 20 does not become conductive due to the voltage developed across the resistor 16 by the detecting current. When the driving transistor 13 is fully turned on by the application of the triggering signal TS and a large current flows through the resistor 16, the diode 20 become fully conductive and the high level current necessary for actuating the electrically fired actuator 3 can be bypassed by the diode 20.

With this arrangement, the low level base bias current is always supplied to the base of the driving transistor 13 by the constant current circuit 21 in response to the voltage developed across the resistor 16, and a small detection current always flows through the series circuit of the diode 7 and the electrically fired actuator 3. The level of the detection current is too small to actuate the electrically fired actuator 3, but the detection current serves to increase the temperature of the electrically fired actuator 3, whereby the improved inflation of the air-bag can be obtained. The voltage V whose level depends upon the ambient temperature of the air-bag 2 is developed across the series circuit of the diode 7 and the electric fired actuator 3 and the detection voltage V is applied to the temperature detecting unit 6 to produce the temperature signal W indicating the ambient temperature of the air-bag 2 or the electrically fired actuator 3.

The map calculation unit 83 is responsive to the temperature signal W and produces the correction signal HD representing the correction value in accordance with the characteristic curve shown in FIG. 3. The standard signal RD is corrected by the correction signal HD to produce the reference signal AO, and the detected speed signal VS is compared with the reference signal AO by the comparing unit 82 to determine whether or not a collision has occurred in the vehicle.

Thus, in the case where a large impact occurs during the vehicle running, when the detected vehicle speed shown by the detected speed signal VS becomes lower than the reference level shown by the reference signal AO, the triggering signal TS is generated and the driving transistor 13 is turned on to actuate the electrically fired actuator 3, whereby the air-bag 2 is inflated to protect the car occupants.

As can be understood from FIGS. 2 and 3, since the correction value $\Delta V$ becomes greater as the detected ambient temperature becomes lower to produce the triggering signal TS earlier, the complete inflation of the air-bag 2 can be reliably obtained by the required time $t_2$ even when more time is necessary for completely inflating the air-bag 2 because of a decrease in the temperature. As a result, the air-bag 2 can always be controlled so as to establish the required protection of the car occupants when a collision has occurred irrespective of changes in temperature.

The arrangement for detecting the temperature of the electrically fired actuator 3 or the air-bag 2 is not limited to that shown in the embodiment described above, but the temperature may instead be detected by means of a thermosensitive element, such as thermister.

Figure 4:
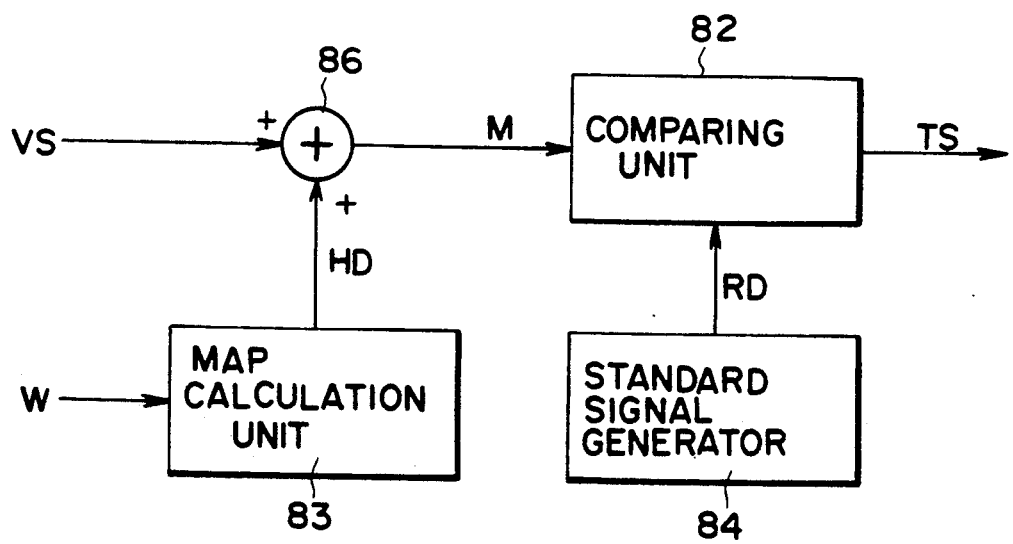
FIG. 4 is a detailed block diagram showing anther arrangement of the discrimination unit of FIG. 1.

Furthermore, the arrangement of the discrimination unit 8 shown in FIG. 1 is only one embodiment and the discrimination unit 8 can be alternatively arranged, for example, as shown in FIG. 4. In FIG. 4, the comparing unit 82, the map calculation unit 83 and the standard signal generator 84 are the same as those shown in FIG. 1. The arrangement of FIG. 4 is different from that shown in FIG. 1 in that the level of the detected speed signal VS is corrected in accordance with the correction signal HD by an adding unit 86 to produce a corrected speed signal M, and the discrimination of the occurrence of vehicle collision is made by comparing the corrected speed signal M with the standard signal RD by the comparing unit 82. However, the operations performed in the two cases are substantially identical and the same effect will be obtained in either case.

I claim:

1. A control system for actuating a vehicle air-bag in response to detection of a collision of a vehicle, said system comprising:

an acceleration sensor for producing an output signal representing an acceleration of the vehicle;

a processing means for producing data representing change in the detected vehicle speed calculated based on the acceleration sensed by said acceleration sensor;

a detecting means for detecting a temperature relating to that of the air-bag; and a discriminating means responsive to said processing means and said detecting means for discriminating whether or not the collision has occurred by comparing the data with a reference signal which is determined in accordance with the detected temperature detected by said detecting means.

2. A control system as claimed in claim 1, wherein the data is obtained by integrating the output signal after the acceleration indicated by the output signal exceeds a predetermined level which is never incurred in the normal running condition of the vehicle.

3. A control system as claimed in claim 1, wherein said discriminating means has a generating means responsive to the output of said detecting means for generating the reference signal and a comparing means for comparing the data with the reference signal in order to discriminate whether or not the change in the detected vehicle speed has reached the level according to the reference signal.

4. A control system as claimed in claim 3, wherein the reference signal is determined in accordance with the detected temperature in such a way that the level according to the reference signal becomes greater as the detected temperature decreases.

5. A control system as claimed in claim 3, wherein said generating means has a signal generator for generating a standard signal, a determination means responsive to the output of said detecting means for determining a correction value corresponding to the detected temperature, and means for correcting the standard signal by the correction value to produce the reference signal.

6. A control system as claimed in claim 5, wherein the correction value is determined on the basis of a predetermined characteristic curve representing the relationship between the correction value and the temperature of an actuating member for said air-bag.

7. A control system as claimed in claim 6, wherein the correction value is determined by a map calculation based on map data corresponding to the predetermined characteristic curve.

8. A control system as claimed in claim 1, wherein said discriminating means has a determination means responsive to the output of said detecting means for determining a correction value corresponding to the detected temperature, means for correcting the data on the basis of the correction value to produce a corrected speed data, means for generating a standard signal, and a comparing means for comparing the corrected speed data with the standard signal in order to discriminate whether or not the magnitude shown by the corrected speed data has reached the level according to the standard signal.

9. A control system as claimed in claim 1, wherein said detecting means has a diode which is located adjacent to an actuating member for said air-bag and is connected in series with the actuating member by a series circuit, a supplying means for supplying to the series circuit of the diode and the actuating member a detection current whose level is too small to actuate the actuating member, and means responsive to a detection voltage developed across the series circuit for determining the temperature relating to the temperature of the actuating member.

10. A control system as claimed in claim 9, wherein said supplying means comprises a constant current circuit for supplying a small current to a base of a driving transistor for controlling an actuating current of the actuating member.

11. A control system as claimed in claim 10, wherein said constant current circuit has a resistor inserted in series into an emitter-collector circuit of the driving transistor and the level of the small current is determined in response to a voltage developed across the resistor.

12. A control system as claimed in claim 11, wherein a second diode is connected in parallel with the resistor to allow a large current for actuating the actuating member to flow through the driving transistor when the driving transistor is turned on.

* * * * *